United States Patent [19]

Kortge

[11] 4,235,025
[45] Nov. 25, 1980

[54] KNEE JOINT FOR ANTHROPOMORPHIC DUMMY

[75] Inventor: James O. Kortge, Fenton, Mich.

[73] Assignee: General Motors Corporation, Detroit, Mich.

[21] Appl. No.: 61,018

[22] Filed: Jul. 26, 1979

[51] Int. Cl.$^3$ ............................................. G09B 23/32
[52] U.S. Cl. ...................................................... 35/17
[58] Field of Search ................. 35/17; 73/172, 432 SD

[56] References Cited

U.S. PATENT DOCUMENTS

| | | | |
|---|---|---|---|
| 2,046,069 | 6/1936 | Greissinger . | |
| 3,557,471 | 1/1971 | Payne et al. | 35/17 |
| 3,739,404 | 6/1973 | Gelbenegger | 3/27 |
| 3,755,920 | 9/1973 | Smrcka | 35/17 |
| 3,841,163 | 10/1974 | Daniel | 73/432 SD |
| 4,000,564 | 1/1977 | Haffner | 35/17 |

Primary Examiner—Harland S. Skogquist
Attorney, Agent, or Firm—Robert M. Sigler

[57] ABSTRACT

A knee joint for an anthropomorphic dummy for use in motor vehicle crash testing comprises a femur member with a cylindrical pivot bearing, a tibia member with a cylindrical socket bearing having a radius greater than that of the pivot bearing, resilient locating strip between the pivot bearing and socket tending to restore the same to a substantially coaxial relationship and a plurality of pivotably linked arms defining a parallelogram having one side centrally pivotably mounted coaxially with the pivot bearing and the two opposite apexes pivotably connected to the tibia member. The arms allow rotation of the tibia with respect to the femur and further allow shearing translation therebetween only in a direction substantially perpendicular to the tibia member.

1 Claim, 3 Drawing Figures

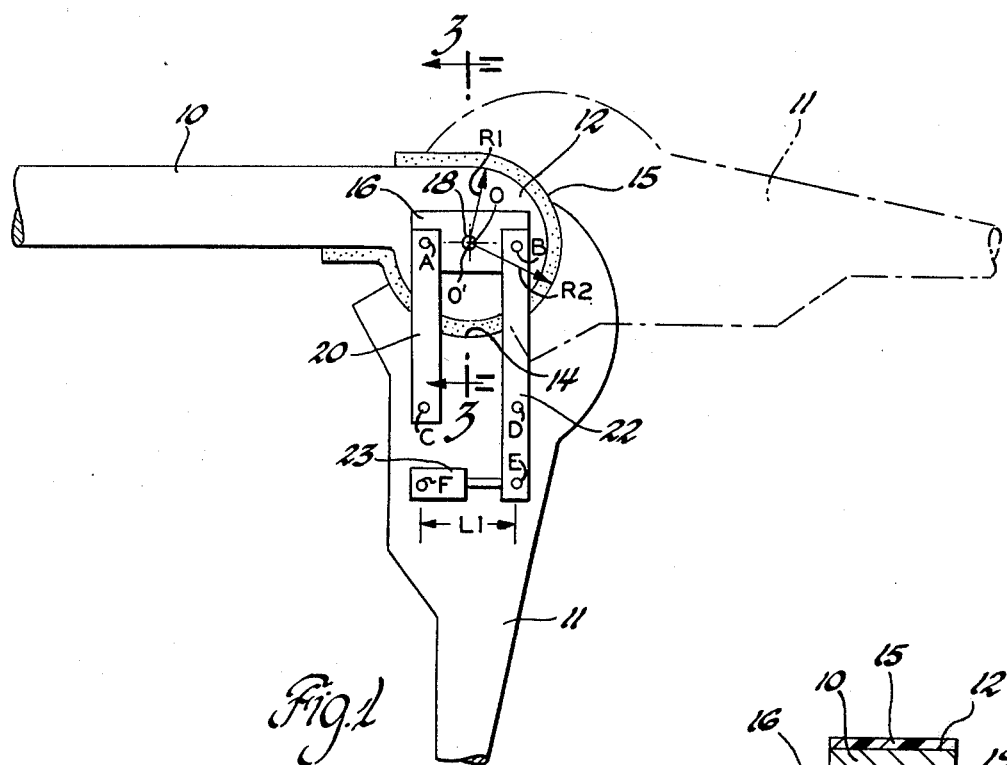
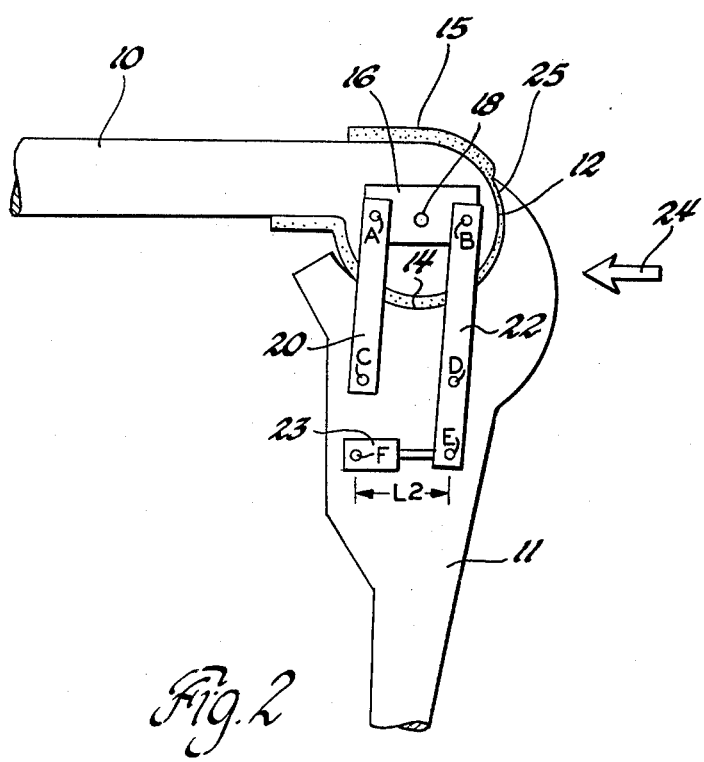
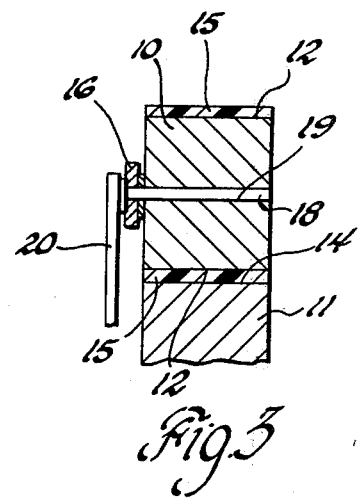

KNEE JOINT FOR ANTHROPOMORPHIC DUMMY

BACKGROUND OF THE INVENTION

This invention relates to knee joints for anthropomorphic dummies used in crash testing of motor vehicles. Such knee joints in the prior art generally comprise simple hinges which allow only rotation of the tibia with respect to the femur about the axis of the hinge. However, the actual knee of a human vehicle occupant in a seated position with the tibia at an approximate right angle to the femur may exhibit a translational or shearing motion between the tibia and femur when the knee is subjected to a frontal load of sufficient magnitude. Additionally, recent research has provided some indication of the allowable femur to tibia translational motion which the human knee can withstand before knee injury occurs. Therefore, it may be possible to test for shearing knee injuries in vehicle crash tests if the dummy knee is redesigned to allow such translational shearing motion when the tibia is at an approximate right angle to the femur. To prevent the recording of false data on such shearing motion, the knee design should not allow such shearing motion from a frontal load when the tibia is in line with the femur as when the lower leg is raised, since the allowable stress to the knee is different in that leg configuration.

SUMMARY OF THE INVENTION

It is an object of this invention, therefore, to provide a knee joint for an anthropomorphic dummy which allows shearing translation between the tibia and femur in response to a load applied substantially at a right angle to the tibia. It is a further object of this invention to provide such a knee joint which exerts a restoring force against such shearing translational motion and which indicates the amount of translational motion achieved against the restoring force.

The invention comprises a femur with a cylindrical pivot bearing, a tibia with a cylindrical socket having a radius greater than that of the pivot bearing to allow translational movement therebetween and resilient locating means between the pivot bearing and socket to oppose translation therebetween. A first arm of a parallelogram is centrally, pivotably mounted axially with the pivot bearing; and two more arms pivotably attached to the ends of the first arm and to the tibia complete the parallelogram. These arms allow shearing translation between tibia and femur in a direction perpendicular to the tibia but not parallel to the tibia. An extension of one of the arms past the pivot connection to the tibia provides a point which moves relative to a fixed point on the tibia with a translation between tibia and femur to indicate the amount of said translation. Further details and advantages of this invention will be apparent from the accompanying drawings and following description of a preferred embodiment.

SUMMARY OF THE DRAWINGS

FIG. 1 is a schematic side view of a dummy knee joint in accordance with this invention.

FIG. 2 is a view similar to that of FIG. 1 of a dummy knee joint with shearing translational motion between tibia and femur.

FIG. 3 is a cutaway view along lines 3—3 of FIG. 1.

DESCRIPTION OF THE PREFERRED EMBODIMENT

Referring to FIG. 1, a femur member 10 and tibia member 11 are joined in a knee joint. Femur 10 and tibia 11 may be those members already well known in anthropomorphic dummies for vehicle crash testing, except as modified in a manner described herein. Femur member 10 is the supporting member of the upper leg in such dummies, while tibia member 11 is the supporting member for the lower leg.

As shown in FIGS. 1 and 3, femur member 10 is provided, at one end, with a cylindrical pivot bearing 12, which has a predetermined radius of rotation R1 about an axis. Tibia member 11 is provided at one end with a cylindrical socket 14 which has a radius of rotation R2 about an axis O'. Resilient locating means 15 comprises a strip of elastomeric material between pivot bearing 12 and socket 14 which tends to maintain tibia 11 in position relative to femur 10 so that the axis O and O' are substantially colinear. Elastomeric strip 15 is made of a material, such as butyl rubber or polyacrylate material, which exerts a restoring force that increases with compression; and the precise composition of the material and thickness of the strip are chosen to approximate the restoring force found in the human knee complex itself.

A first arm 16 is centrally, pivotably mounted on a pin 18, which is retained coaxially with axis O in an opening 19 within femur member 10. A second arm 20 is pivotably linked at one end to one end of arm 16 at point A and is pivotably linked at the other end to tibia member 11 at point C. A third arm 22 is pivotably linked at one end to the other end of arm 16 at point B and is pivotably linked at point D to tibia member 11. Points A, B, C and D form the apexes of a parallelogram in which side AB equals side CD in length and side AC equals side BD in length. However, since the arms are linked pivotably, the angles between the sides of the parallelogram may change; and this permits shearing translation of the tibia member 11 with respect to the femur member 10 in the direction of sides AB or CD of the parallelogram, but not in the direction of sides AC or BD.

Arm 22 extends beyond point D and is pivotably connected at point E with a linear potentiometer or similar linear motion transducer 23, which is pivotably linked to tibia 11 at F. The line joining points E and F is parallel to that joining points C and D so that, as shearing translation takes place between tibia 11 and femur 10 with a resultant change in the angle BDC from a right angle to a greater than right angle, the distance between points E and F will shorten; and this shortening will be sensed by potentiometer 23, which is capable of generating electrical output analog signal of said length for appropriate telemetering equipment.

The knee of this invention in its normal, unloaded configuration is shown in FIG. 1, in which the length from point E to point F is denoted as L1. In this configuration, axis O and axis O' correspond and angle BDC is a right angle. Tibia member 11 is shown at a substantially right angle to femur member 10 as would be the case of a dummy in a seated position. FIG. 2 shows the configuration of the knee apparatus when subjected to a frontal load denoted by arrow 24. In this configuration, tibia member 11 has been translated in a shearing motion with respect to femur member 10, thus compressing the resilient locating means 15 in the area 25 as shown.

Arms 20 and 22 have pivoted about points C and D, respectively, so that angle BDC is greater than a right angle and length L2 between points E and F is less than length L1 as shown in FIG. 1. The apparatus will return to the configuration of FIG. 1 as soon as load 24 is removed.

Tibia member 11 is, of course, free to rotate about cylindrical pivot bearing 12 of femur member 10 without disturbing the shape of parallelogram ABCD or the length L1, since arm 16 rotates about the same axis as tibia member 11 in an unloaded state. If tibia member 11 assumes the dashed line position shown in FIG. 1, in which it is substantially co-linear with femur member 10, a frontal load on the leg or knee in the direction shown by arrow 24 in FIG. 2 would not cause shearing translation between tibia 11 and femur 10, since the load would be resisted by arms 20 and 22 bearing against arm 16. This is an important aspect of the invention since, in a vehicle crash test, the lower leg may be thrown upward into this position before the crash load is applied. In this case it is important for the potentiometer 23 not to indicate shearing translation unless such shearing translation actually takes place, as it would if the load were then applied from the top of the knee downward. Thus, the knee of this invention simulates the response of the actual human knee to such loads; and the data produced from linear potentiometer 23 is relevant to the prediction of injury to an actual human knee in such crash tests. The embodiment as shown and described herein is the preferred embodiment of this invention. However, equivalent embodiments will occur to those skilled in the art; and this invention should therefore be limited only by the claim which follows.

The embodiments of the invention in which an exclusive property or privilege is claimed are defined as follows:

1. A knee joint for an anthropomorphic dummy comprising, in combination:
   a femur member having a cylindrical pivot bearing;
   a tibia member having a cylindrical socket adapted to receive the femur pivot bearing therein, the radius of the socket being greater than that of the pivot bearing to allow translational movement therebetween;
   resilient locating means between the pivot bearing and socket tending to restore the same to a substantially coaxial relationship;
   a plurality of pivotably linked arms defining a parallelogram with four apexes, a first and second of the arms being parallel and further being connected pivotably, each at one of two adjacent apexes, to the tibia member and being further connected pivotably, each at one of the other two apexes to a third arm, the third arm being centrally, pivotably supported by the femur coaxially with the pivot bearing, the plurality of arms thereby being effective to link the femur and tibia members, allow rotation and shearing translation therebetween in a direction substantially perpendicular to the tibia member, prevent translation therebetween in a direction not substantially perpendicular to the tibia member and indicate, through movement of the first or second arm relative to the tibia member, the amount of shearing translation.

* * * * *